Nov. 14, 1944.
R. M. SCHULTZ
2,362,936
SUB STATION PROTECTORS
Filed April 18, 1942
3 Sheets-Sheet 2
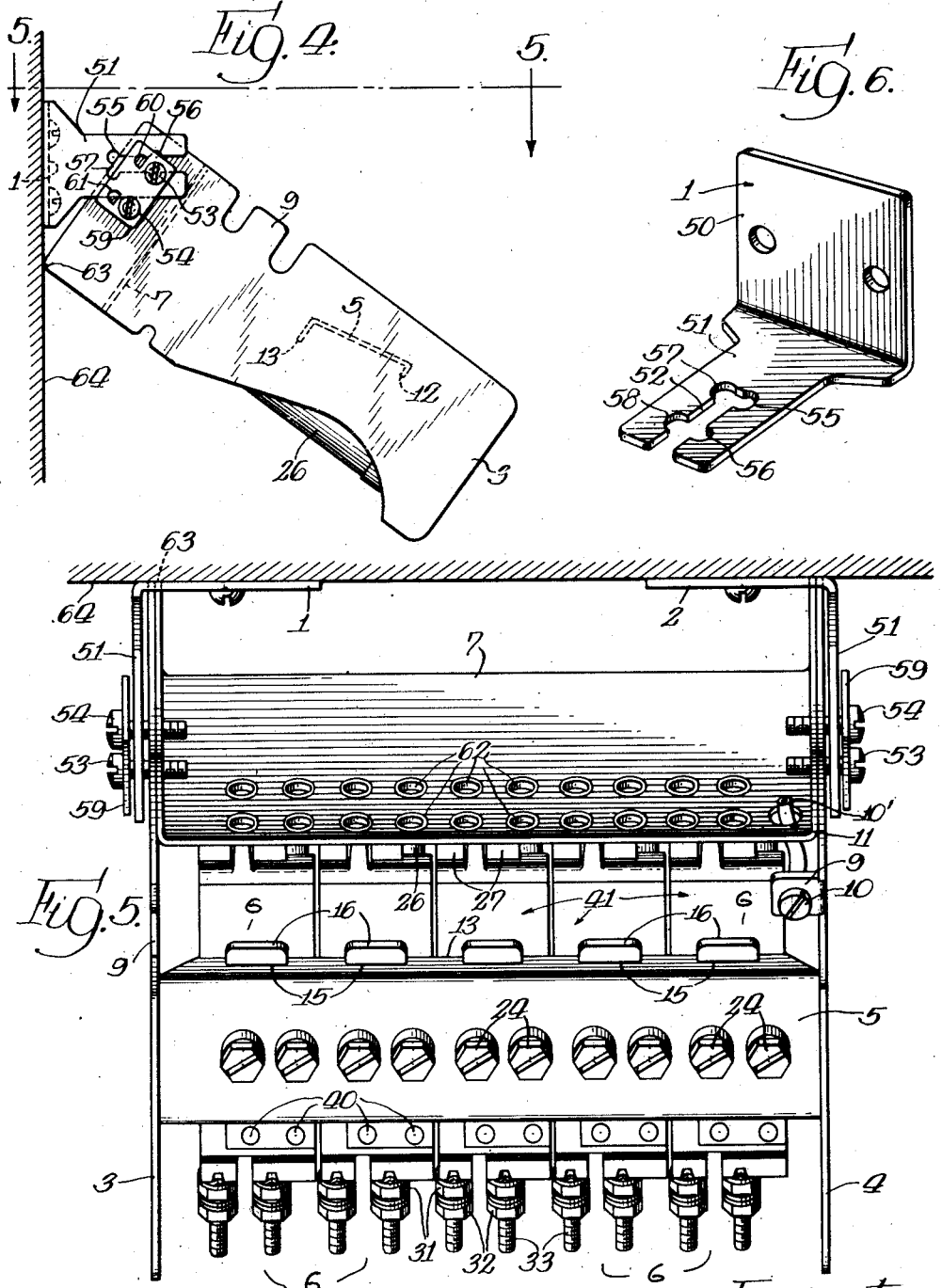

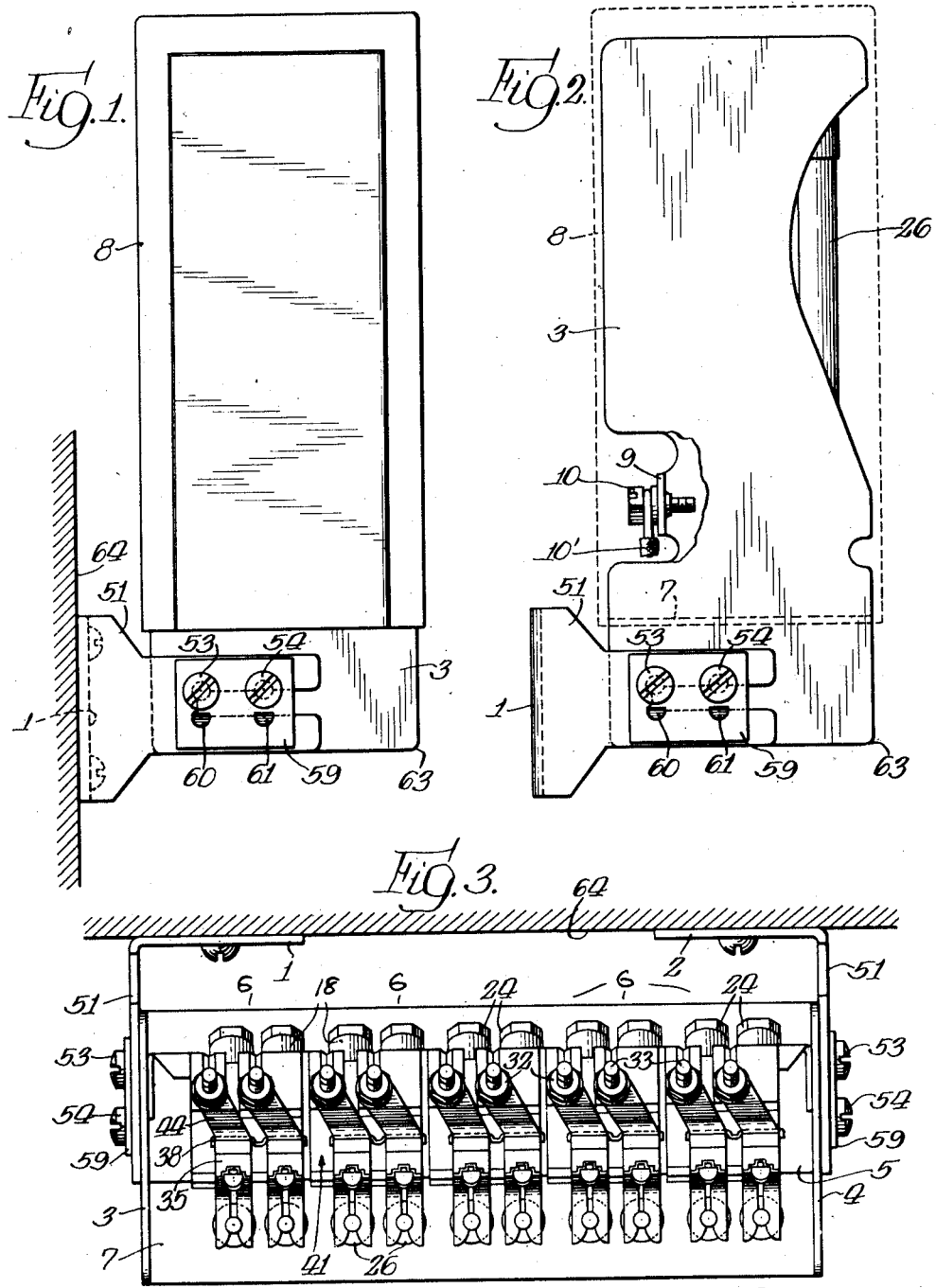

Nov. 14, 1944.  R. M. SCHULTZ  2,362,936
SUB STATION PROTECTORS
Filed April 18, 1942  3 Sheets-Sheet 3
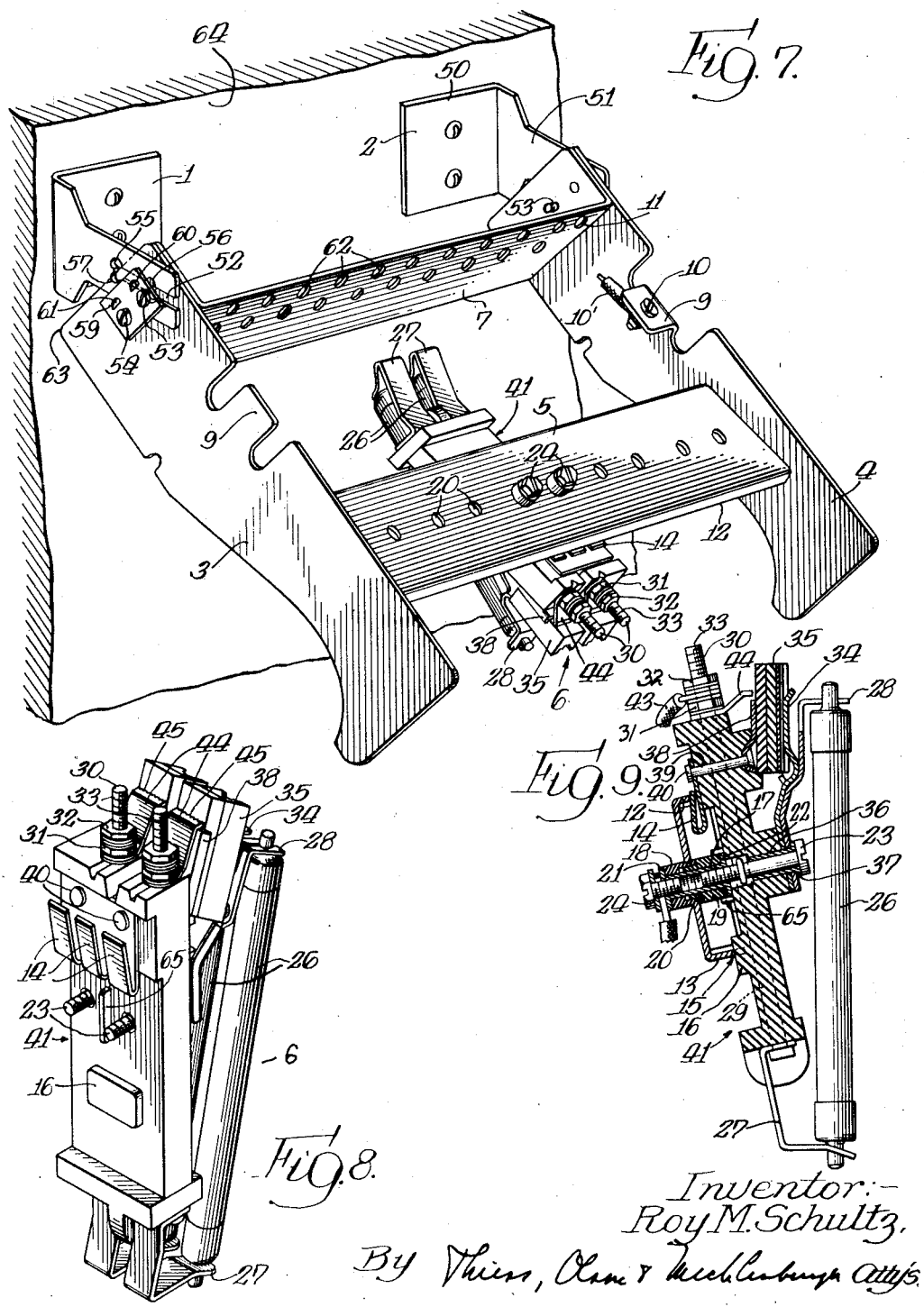
Inventor:—
Roy M. Schultz.
By Thiess, Olam & Mecklenburg attys.

Patented Nov. 14, 1944

2,362,936

UNITED STATES PATENT OFFICE 2,362,936

SUBSTATION PROTECTOR

Roy M. Schultz, Chicago, Ill., assignor to Cook Electric Company, Chicago, Ill., a corporation of Illinois Application April 18, 1942, Serial No. 439,490

20 Claims. (Cl. 200—115)

This invention relates to a novel type of terminal box construction adapted to provide a simple and inexpensive form of utility and substation protector for small cables and open wires, say, at railroad crossings, power line crossovers and parallels, or for subscriber's drops where several instruments are closely grouped.

It is an object of the invention to provide a compact and convenient unit of this type capable of wide utility and which is exceptionally sturdy to permit use wherever inside or outside protection or cable termination may be required.

The invention is also directed to a novel form of mounting bracket adapted to allow the unit to be brought to a tilted position whereby conveniently to expose at the front of the unit certain normally inaccessible terminals and thereby to facilitate the making or changing of wiring connections. When these connections are completed, the terminal box may be raised about its mounting upon this bracket and secured in a normally vertical position.

It is also an object of the invention to provide, in a communication system or the like, a terminal box of the type and kind that permits of ready adaptation of a standard form of protector unit which may be interchangeably used in other unit divisions of the system whereby greater flexibility and efficiency in the use of the equipment and desirable economies in operation resulting from smaller inventory requirements will be obtained.

The use to which a device of this type is put requires that it be compact and sturdy. The parts may not be spread so as needlessly to occupy space. Cost is also an important item of consideration. Equipment must be kept in readiness, and consequently, inventory requirements to meet service demands of additional lines or replacements, particularly during emergency periods, become a burden in the maintenance of communication systems. The present invention provides for such compactness, simplicity and sturdiness in the form of a structure that is adapted to be mounted in a manner admitting of a swinging or tilting movement exposing at the front of the terminal box terminals or wiring connections that become inaccessible, or at least are inconveniently positioned, when the terminal box is in its normal position of use. Certain novel features are embodied in this form of structure that permit such compactness but still provide for convenient access, when desired, to any terminals or parts that become inconveniently positioned or otherwise inaccessible.

In the drawings:

Figure 1 is a side elevation of a terminal box embodying the invention, the box and cover being shown in mounted position upon a wall or other equivalent mounting;

Fig. 2 is a view similar to Fig. 1 but with the cover shown in dotted lines;

Fig. 3 is a top elevation of the terminal box with the cover removed;

Fig. 4 is a side elevation of the terminal box swung to a tilted position to facilitate access to certain of the terminals in making or changing the wiring connections;

Fig. 5 is a top plan view of the structure in its position shown in Fig. 4, this view being taken along line 5—5 of Fig. 4;

Fig. 6 is a perspective view of one of the interchangeable mounting brackets;

Fig. 7 is a perspective view of the structure in its tilted position;

Fig. 8 is a perspective view of a standard form of protector unit which may be interchangeably used in the terminal box herein disclosed, as well as in other unit divisions of a communication system; and Fig. 9 is a vertical sectional view of this protector unit along a plane intersecting one of the transverse conductors that serve as the fastening means for holding the protector unit in mounted position in the terminal box.

The terminal box illustrated in the accompanying drawings may include a pair of interchangeable wall mounting brackets 1 and 2, side walls 3 and 4, a transverse mounting plate 5 connected between these side walls, one or more protector units 6 adapted to be detachably connected to transverse mounting plate 5, a bottom plate 7, and a suitable cover or enclosure 8 adapted to be placed over the side walls 3 and 4 so as to enclose protector units 6 therein.

Side walls 3 and 4 and transverse mounting plate 5 are made of conducting material in the form of cast or sheet metal stampings. Side walls 3 and 4 are interchangeable in the assembly of the device, each being provided with an ear 9, which on one of the side walls may be turned inwardly to form a lug which receives a grounding terminal 10. A grounded wire 10' is attached to terminal 10 and is led outwardly of the terminal box through an opening 11 provided in bottom plate 7.

Transverse mounting plate 5 may be secured between side walls 3 and 4 in any desirable manner. It is provided with top and bottom cross flanges 12 and 13 that serve as means for positioning each protector unit 6 upon the mounting plate. Upper flange 12 acts as a bearing stop against which a spring-formed ground terminal finger 14 on protector units 6 press in order to assure a perfect grounding contact between certain of the terminals on these protector units and the frame structure which is permanently grounded through ground terminal 10. Flange 13 is disposed along the lower edge of mounting plate 5 and is provided with cut-away portions 15 into which shoulders 16 on the body of the protector units 6 seat. In addition to flanges 12 and 13, means are provided for detachably connecting each protector unit to mounting plate 5. This means may comprise metallic members 17 adapted, as shown in detail in Fig. 9, to pass through aligned insulation sleeves 18 and 19 having their inner ends in overlapping relation and being seated in openings 20 in plate 5. Irrespective of whether metallic members 17 are first slipped through sleeves 18 or sleeves 19, one end of these members 17 is provided with a head 21, while the other end is formed into a head 22 after these members are inserted in sleeves 18 and 19. Metallic members 17 are internally threaded and receive bolts 23 that mount the protector units 6 upon plate 5 and bolts 24 at the opposite ends which form terminals for the incoming or line wires 25.

Mounting plates 5 and the means for mounting the protector units 6 thereon advantageously permit the use of protector units that may be readily adapted interchangeably in a number of different sub-stations in a communication system. This provides for standardization of equipment and the carrying of a small inventory to meet the various requirements for additional equipment from time to time in the operation of the system. Although the form of protector unit shown has been disclosed and claimed in United States Letters Patent No. 2,223,540, granted to applicant on December 3, 1940, other forms may be used.

As illustrated, each unit comprises molded resinous material adapted to carry fuses 26 between clips 27 and 28. Fuse clips 27 are attached at one end of base 41 by rods 29 extending longitudinally through the base. The opposite ends of rods 29 are threaded, as indicated at 30. Lock nuts 31 hold rods 29 in position upon base 41. The usual terminal nuts 32 and the threaded ends 30 form terminal posts 33. Fuse clips 28, together with clips 34 of lightning arresters 35, are attached to base 41 by metallic sleeves 36 which are provided with heads 37 at one end. The opposite lightning arrester clips 38 are also held by similar metallic sleeves 39 that are riveted over at one of their ends, as at 40. Spring-formed grounding terminals 14 are connected through these sleeves 39 with lightning arrester clips 38 to provide an earth connection for lightning arresters 35.

Base 41 may be molded with openings for receiving rods 29 and sleeves 36 and 39, or these latter parts may be molded directly in base 41 during the molding operation. Sleeves 17 and 36 are located crosswise in base 41 to form with bolts 23 and 24 the electrical connection for one side of the circuit, say, the incoming side, to one end of each fuse 26, the bolts 23 also serving as the fastening means for each protector 6 upon mounting plate 5. Locating clips 27 and 28 in the manner shown allows the circuit to continue upwardly of base 41 from the point of connection 36, then downwardly through fuses 26, then upwardly through rods 29 from the lower end of the base to the top thereof at terminal posts 33, the term "top" being relative and depending how units 6 are arranged for mounting upon plate 5. Rods 29 and sleeves 36 are in different planes in base 41 so that electrical contact between these parts is prevented.

Sleeves 36 may be located anywhere intermediate the base 41. If fuses 26 are of the character herein shown, these sleeves 36 may be disposed crosswise anywhere along base 41 so that fuses 26 extend in a general downward direction to make proper contact with rods 29 at clips 27. The circuit is then taken back through base 41 by means of these rods 29 which have their upper ends comprising the aforesaid terminal posts 33 adapted to receive the customer's drop wires or outgoing connections 43.

If high voltages are accidentally picked up through the side of the line connected to terminal posts 33, lightning arresters 35 afford no protection to equipment connected therein if the fuses should blow because the lightning arresters are on the side of the fuses opposite the side connected to terminal posts 33. If one or both of the fuses should blow, there will be a complete separation between the equipment on the side of the fuses beginning with clips 27, rods 29, terminals 33, and the equipment on the other side of the fuses beginning with clip 28 and extending through the line connected to terminal posts 24. Consequently, any high voltage that may be induced by lightning or directly obtainable therefrom, or otherwise caused to exist upon the side of the line connected to terminal posts 33, is apt to remain for a time without being dissipated. It is undesirable to allow such high voltage to remain upon these parts and upon the side of the line connected to terminal posts 33 without being immediately grounded particularly when such high voltage charges may reach as high as 2500 volts or more. To protect equipment at both ends of the fuses against such high voltage charges, arrester blades 44 or the like are provided upon the upper end of rods 29 near terminal posts 33. Arrester blades 44 may have saw-toothed edges 45 positioned a predetermined distance from the lightning arrester block 35 to form a permanent discharge gap whereby abnormal high voltage charges may be dissipated through the ground that is established by the carbon block of arrester 35 and by the clip 38 connected to the sleeve 39, the latter being connected to the spring-formed blade 14 that is adapted to be grounded by its engagement with flange 12 of mounting plate 5. Only the arrester blades 44 are necessary as to material required to form this second arrester. These blades 44 are carried upon rods 29 at terminal ends 33. No additional parts are required.

Although I have described one form of protector unit disclosed in my aforesaid Patent No. 2,223,540, it will be understood that any form of protector unit may be used.

In addition to simplicity in the construction of side walls 3 and 4 between which the mounting plate 5 is supported for receiving any number of protector units 6, an improved form of mounting is provided to permit the structure to tilt downwardly from its vertical position in order to make terminals 24 conveniently accessible for changes in wiring connections. In this connection, mounting plates 1 and 2 are in the form of angular brackets, each having a base leg 50 and an outstanding leg 51. Each leg 51 may be provided with an open slot 52 which is slightly larger in width than the diameter of the threaded shanks of fastening screws 53 and 54.

These screws are therefore free to move along slots 52. The inside edges of the two parts of each leg 51 formed by this central slot 52 are provided with pairs of semicircular openings, the upper pair being designated 55 and 56, and the lower pair being designated 57 and 58. Screws 53 and 54 of each mounting bracket are carried by a locking plate 59, the arrangement porviding for the positioning of leg 51 between either side wall 3 or 4 and this locking plate 59. As illustrated in Figs. 1 and 2, the shanks of fastening screws 53 and 54 lie in openings 55 and 56 when the terminal box is in its normal upright position. These screws 53 and 54 are, of course, threaded inwardly in tight relation so as to bring locking plate 59 tightly against the outside face of leg 51. To prevent the weight of the terminal box or vibratory forces from causing fastening screws 53 and 54 to drop out of openings 55 and 56, a pair of locking keys 60 and 61 of semicircular formation are struck inwardly on plate 59 so as to lie in the lower openings 57 and 58 when this plate 59 is brought tightly against the outer face of leg 51 with fastening screws 53 and 54 in the upper openings 55 and 56. With the parts in this relation, the terminal box is securely held in its upright position, as shown in Figs. 1 and 2.

In the event it is desired to obtain access to the rear terminals 24 for the purpose of making changes in wiring connections that lead through the openings 62 in bottom plate 7, or for the purpose of making changes of these wiring connections at terminals 33, or for the purpose of making new connections when additional protector units 6 are mounted upon plate 5, fastening screws 53 and 54 are loosened sufficiently on each side to free the keys 60 and 61 from the lower openings 57 and 58. The terminal box is then moved slightly forward to cause the shank of fastening screw 53 to drop into the lower opening 58 and serve as a pivot about which the terminal box may be tilted to the positions shown in Figs. 4 and 7, it being noted that the lower corners 63 of the side walls 3 and 4 are arranged to abut against the wall 64 or like mounting to which mounting brackets 1 and 2 are attached. The abutment of these corners 63 of side walls 3 and 4 hold the terminal box in a forwardly tilted position so as to make terminals 24 and the conductors extending into the terminal box through openings 62 in bottom plate 7 readily accessible to complete any connections or changes in connections that may be desired. It will be seen that with the terminal box in its normal upright position, protector units 6 are mounted upon the front face of mounting plate 5, and the terminals 24 as well as the incoming and outgoing conductors extending through openings 62 in bottom plate 7 are at the rear of mounting plate 5. The convenience of having these incoming and outgoing conductors readily accessible, as well as the terminals 24, eliminates errors in making connections because linemen have these terminals and conductors readily visible when the terminal box is allowed to swing to tilted position as disclosed herein. Once the terminal box is swung to tilted position, it will remain firmly in this position until the connections or changes in connections have been completed. The weight of the termial box tends to pull the fastening screws 53 forwardly into openings 58 of each mounting plate, while the corners 63 of side walls 3 and 4 abut against the mounting surface, this arrangement providing a firm anchorage for the terminal box in its tilted position. After the connections have been made, the lineman readily swings the terminal box upwardly to locate fastening screws 53 in upper openings 55, and 56, and the tightening of these fastening screws 53 and 54 will bring keys 60 and 61 on locking plates 59 into engagement with lower openings 57 and 58 so as to hold the terminal box firmly in its upright position.

The arrangement herein disclosed provides an exceedingly simple form of terminal box construction that has certain novel and new features provided for convenient use of the terminal box in the field. Due to the fact that the mounting brackets 1 and 2 are interchangeable with each other and the side walls 3 and 4 are interchangeable with each other, the device is extremely simple and inexpensive to construct. Mounting plate 5 with its flanges 12 and 13 allows a quick connection or replacement of the protector units 6. When mounting these protector units 6, the insulation body 41 of each unit forms in effect the base, which is brought against the outer face of mounting plate 5 so that its shoulder 16 will seat in cut-away portion 15 of lower flange 13. The fastening bolts 23 may then be inserted together with bolts 24 in metallic members 17 whereupon the spring-formed grounding fingers 14 will firmly bear against the upper flange 12 of mounting plate 5. Thus, the method of attaching each protector unit automatically seats the same upon the front face of the mounting plate in a predetermined position. Seating shoulder 16 in cut-away portion 15 in lower flange 13 automatically positions and keeps the protector units properly spaced from each other, as illustrated in Fig. 5. If desired, an insulation barrier 65 may be provided on body 41 between heads 22 of metallic members 17 to prevent current creepage or jumping between these parts.

It will be apparent that the terminal box may be used with any number of units 6, this being illustrated in Fig. 7 by the use of one unit and by Figs. 3 and 5 which illustrate the use of five units. If more units than five are desirable, the terminal box may be made wider and additional openings 20 and 62 may be provided. The invention need not be limited to the use of two brackets 1 and 2, but its application may be extended to whatever may be needed in any given instance.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In a terminal box, a frame structure including a grounded conductor plate, a protector unit having protective devices and associated terminals accommodating incoming and outgoing conductor connections and a ground terminal, means for detachably connecting said protector unit to said conductor plate, said ground terminal being in electrical relation with said conductor plate, bracket means adapted to be secured to a supporting wall, there being means between said bracket means and said frame structure arranged and constructed to carry said frame structure in an upright position but being releasable to swing said frame structure to a downwardly tilted position.

2. In a terminal box, a frame structure including a grounded conductor plate having a front and a rear face, a protector unit having protective devices and associated terminals accommodating incoming and outgoing conductor connections and a ground terminal, means for detachably connecting said protector unit to the front face of said conductor plate with certain of said conductor connections being exposed at said rear face, said ground terminal being in electrical relation with said conductor plate, bracket means for carrying said frame structure upon a supporting wall, there being means between said bracket means and said frame structure arranged and constructed to hold said frame structure in an upright position but being releasable to swing said frame structure to a downwardly tilted position.

3. In a terminal box, a frame structure including a mounting plate having a front and a rear face, bracket means for carrying said frame structure in a normal upright position upon a supporting wall, a protector unit having protective devices and associated terminals accommodating incoming and outgoing conductor connections, means for detachably connecting said protector unit to the front face of said mounting plate with at least certain of said conductor connections being exposed at said rear face, and means to hold said frame structure in said upright position but being releasable to cause said frame structure to swing to a downwardly tilted position to expose said rear face.

4. In a terminal box, a frame structure including a mounting plate, a protector unit having protective devices and associated terminals acommodating incoming and outgoing conductor connections, means for detachably connecting said protector unit to said mounting plate, bracket means for carrying said frame structure in a normally upright position against a supporting wall, and means to lock said frame structure in said upright position but being releasable to cause said frame structure to swing to a downwardly tilted position to expose the inside of said mounting plate.

5. In a terminal box, a frame structure including a mounting plate having a front and a rear face, bracket means for carrying said frame structure in a normally upright position against a supporting wall with said rear face positioned in the direction toward said supporting wall, a unit having terminals accommodating incoming and outgoing conductor connections, means detachably connecting said unit to said mounting plate with certain of the parts of said unit being exposed at said rear face, and means for releasing said frame structure from its said upright position whereby said frame structure may swing about said bracket means as a pivot to a downwardly tilted position to expose said rear face of said mounting plate at the front of said terminal box.

6. In a terminal box, a frame structure including a mounting plate having a front and a rear face, a unit having terminals accommodating incoming and outgoing conductor connections, means for detachably connecting said unit to said mounting plate with certain of the parts of said unit being exposed at said rear face, bracket means for carrying said frame structure in a normally upright position against a supporting wall with said unit parts exposed at said rear face and being inaccessible at the front of said terminal box, access to said unit parts being thereby confined to the space between said supporting wall and said mounting plate, and means to hold said frame structure in said upright position but being releasable to cause said frame structure to swing to a downwardly tilted position and thereby expose said unit parts at the front of said terminal box.

7. In a terminal box, a frame structure including two side walls, a transverse mounting plate and a bottom plate acting as a fanning strip, one or more protector units having terminals accommodating incoming and outgoing conductor connections, means for detachably connecting said protector units in a predetermined spaced relation upon said transverse mounting plate with certain of the parts of said units being inaccessible at the front of said mounting plate when said frame structure is in a normally upright position, and means for holding said frame structure in said upright position, said holding means being releasable whereby said frame structure may be swung to a generally downwardly tilted position to bring said unit parts in an exposed position in front of the terminal box.

8. In a terminal box, a frame structure including two side walls, a transverse mounting plate and a bottom plate having a number of openings therein through which incoming and outgoing conductors pass, one or more protector units having terminals for accommodating said incoming and said outgoing conductors, means for detachably connecting said protector units upon said transverse mounting plate with certain of the parts of said units being inaccessible at the front of said transverse mounting plate when said frame is normally in an upright position, bracket means for carrying said frame structure, and means associated with said bracket means and said side walls for holding frame structure in said upright position, said means being releasable whereby said frame structure may be swung to a generally downwardly tilted position to bring said unit parts in an exposed position in front of said terminal box.

9. In a terminal box, a frame structure including two side walls, a transverse mounting plate and a bottom plate having a number of openings therein through which incoming and outgoing conductors pass, one or more protector units having termials for accommodating said incoming and outgoing conductors, means for connecting said protector units upon said transverse mounting plate with certain of the parts of said units being disposed upon a side of said transverse mounting plate that is inaccessible at the front of said frame structure when said frame structure is normally in an upright position, bracket means to which said side walls are pivotally connected, said bracket means being so arranged and constructed that when said frame structure is in an upright position it may be locked against pivoted movement but when released said frame structure may be swung downwardly to a position bringing said unit parts in an exposed position accessible at the front of said frame structure.

10. In a terminal box, a frame structure including a side wall and a mounting plate extending crosswise from said side wall, one or more protector units having terminals for accommodating incoming and outgoing conductors, means for connecting said protector units upon said mounting plate with certain of the parts of said units being inaccessible at the front of said mounting plate when said frame structure is normally in an upright position, bracket means for carrying said frame structure, and means associated with said bracket means and said side wall for holding said frame structure in said upright position, said means being releasable whereby said frame structure may be swung to a generally downwardly tilted position to bring said unit parts in an exposed position at the front of said terminal box.

11. In a terminal box, a frame structure including a side wall and a mounting plate extending crosswise with respect to said side wall and having a rear and a front face when said frame structure is in an upright position, one or more electrical units having terminals for accommodating incoming and outgoing conductors, means for connecting said units upon said mounting plate, bracket means for carrying said frame structure, and means associated with said bracket means and said side wall for holding said frame structure in an upright position, said means being releasable whereby said frame structure may be swung to a generally downwardly tilted position to bring said rear face in an exposed position at the front of said terminal box.

12. In a terminal box, a frame structure including a pair of spaced side walls and a transverse mounting plate between said side walls, said transverse mounting plate having a face inaccessible at the front of said frame structure when said frame structure is in a normally upright position, electrical terminals upon said transverse mounting plate, certain of said terminals being carried upon said inaccessible face, bracket means for carrying said frame structure, and means associated with said bracket means and said frame structure for holding the latter in said upright position, said means being releasable whereby said frame structure may be swung to a generally downwardly tilted position to bring said inaccessible face in an exposed position in front of said terminal box.

13. In a terminal box, a frame structure including a pair of spaced side walls and a transverse mounting plate between said side walls, said transverse mounting plate having a face inaccessible at the front of said frame structure when said frame structure is in a normally upright position, electrical terminals upon said transverse mounting plate, said terminals being exposed at said inaccessible face of said transverse mounting plate, a pair of brackets for carrying said frame structure upon a supporting wall, and means for locking said frame structure in said upright position upon said supporting wall, said means being releasable whereby said frame structure may be swung to a generally downwardly tilted position to bring said inaccessible face in an exposed position in front of said terminal box, there being shoulders upon said frame structure adapted to abut the said supporting wall to limit the tilting movement of said frame structure.

14. In a terminal box, a frame structure including a pair of spaced side walls and a transverse mounting plate between said side walls, said transverse mounting plate having a face inaccessible at the front of said frame structure when said frame structure is in a normally upright position, electrical terminals upon said transverse mounting plate, said terminals being exposed at said inaccessible face of said transverse mounting plate, a pair of brackets including fastening members for carrying said frame structure upon a supporting wall, said brackets each having a slot open at one end for receiving said fastening members, there being recesses along the opposite edges of said slots, certain of said recesses receiving said fastening members when said frame structure is in said upright position, and key means adapted to engage in the other of said recesses to lock said fastening members in their said recesses whereby to lock said frame structure in said upright position, the releasing of said key means from their said recesses permitting said frame structure to be tilted in a generally downward position to expose said inaccessible face at the front of said terminal box.

15. In a terminal box, a frame structure including a pair of spaced side walls and a transverse mounting plate between said side walls, said transverse mounting plate having a face inaccessible at the front of said frame structure when said frame structure is in a normally upright position, electrical terminals being exposed at said inaccessible face of said transverse mounting plate, a pair of brackets including threaded fastening bolts for carrying said frame structure upon a supporting wall, said brackets each having an elongated slot for receiving said bolts, there being recesses along the opposite edges of said slots, the recesses along one edge receiving said bolts when said frame structure is in said upright position, and key means for projecting into said recesses along the other edge whereby to hold said frame structure in an upright position, the arrangement of said parts allowing one of said bolts to lie in one of the recesses receiving said key means when said frame structure is tilted in a generally downward position to expose said inaccessible face at the front of said terminal box.

16. In combination with a terminal box having a normally upright position and a terminal carrying face that is inaccessible at the front of said terminal box when in said upright position, a pair of brackets for carrying said terminal box upon a supporting wall, and means for holding said terminal box in said upright position upon said brackets, said means being releasable whereby said terminal box may be tilted about said brackets to a generally downward position to expose said inaccessible terminal carrying face at the front of said terminal box.

17. In combination with a terminal box having a normally upright position and terminal connections that are inaccessible at the front of said terminal box when in said upright position, a pair of brackets for carrying said terminal box upon a supporting wall, and means for holding said terminal box in said upright position upon said brackets, said means being releasable whereby said terminal box may be tilted about said brackets to a generally downward position to expose said inaccessible terminal connections at the front of said terminal box, the parts being constructed and arranged to cause the outer lower corners of said terminal box to abut said supporting wall to hold said terminal box in its said tilted position.

18. In combination with a terminal box having a normally upright position and terminal parts that are inaccessible at the front of said terminal box when in said upright position, brackets for carrying said terminal box upon a supporting wall, and means for holding said terminal box in said upright position, said means including a locking plate and locking bolts extending through said plate, said brackets and an adjacent portion of said terminal box, and means on said locking plate adapted to be released from their position holding said terminal box in said upright position whereby said terminal box may be tilted to a generally downward position to expose said inaccessible terminal parts at the front of said terminal box.

19. In combination with a terminal box having a normally upright position, brackets for carrying said terminal box upon a supporting wall, said brackets having outwardly extending slotted legs, recesses along the upper and lower edges of the slots, a plate for each bracket, fastening members carried by said plates, said fastening members lying in said slots and extending into adjacent portions of said terminal box, said fastening members adapted to lie in said recesses along the upper edges of said slots, and key means on said plates adapted to lie in said recesses along the lower edges of said slots.

20. In combination with a terminal box having a normally upright position and terminal parts that are inaccessible at the front of said terminal box when in said upright position, brackets for carrying said terminal box upon a supporting wall, said brackets having outwardly extending open slotted legs, recesses along the upper and lower edges of the slots, a plate for each bracket, fastening members carried by said plates, said fastening members movable along said slots and extending into adjacent portions of said terminal box, said fastening members adapted to lie in said recesses along the upper edges of said slots when said terminal box is in upright position, said fastening members being moved along said slots until certain of said fastening members lie in one of said recesses along the lower edge of each slot whereby to provide a pivotal hinge about which said terminal box may tilt and expose said inaccessible terminal parts at the front of said terminal box.

ROY M. SCHULTZ.